United States Patent

Rogers

[11] Patent Number: 5,993,296
[45] Date of Patent: Nov. 30, 1999

[54] TOOL QUILL AND METHOD FOR FINISHING FUEL INJECTOR NEEDLE TIPS

[75] Inventor: William June Rogers, Newport News, Va.

[73] Assignee: Siemens Automotive Corporation, Auburn Hills, Mich.

[21] Appl. No.: 09/107,671

[22] Filed: Jun. 30, 1998

[51] Int. Cl.⁶ .................................................. B24B 15/04
[52] U.S. Cl. .......................... 451/49; 451/276; 451/342
[58] Field of Search ............................. 451/50, 342, 283, 451/277, 252, 276, 285

[56] References Cited

U.S. PATENT DOCUMENTS

| | | |
|---|---|---|
| 881,621 | 3/1908 | Rowland et al. . |
| 2,542,154 | 2/1951 | Mesirow ................................ 451/342 |
| 2,982,057 | 5/1961 | Stanhope . |
| 3,050,909 | 8/1962 | Rawstrom . |
| 4,545,706 | 10/1985 | Minoru et al. . |
| 4,551,902 | 11/1985 | Thibaut .................................. 451/342 |
| 5,071,525 | 12/1991 | Kazuo . |
| 5,639,273 | 6/1997 | Sjolander et al. ...................... 451/342 |
| 5,810,647 | 9/1998 | Rogers . |

FOREIGN PATENT DOCUMENTS 36 27 541  2/1988  Germany .

Primary Examiner—Robert A. Rose

[57] ABSTRACT

A tool quill for carrying out superfinish polishing of a fuel injector needle tip to insure proper sealing of a fuel injector has a universal joint which allows tilting of a polishing stone during the finishing operation to accommodate slight positioning errors between the stone and needle tip and their axes of rotation. Slight tilting movements occur against an elastic straightening force exerted on the universal joint to insure constant polishing pressure, which in turn insures accurate shaping of the polished tip surface.

8 Claims, 3 Drawing Sheets

TOOL QUILL AND METHOD FOR FINISHING FUEL INJECTOR NEEDLE TIPS

BACKGROUND OF THE INVENTION

This invention concerns the manufacture of fuel injectors and more particularly the injector needle which is utilized to control the discharge of fuel from the injector. The injector comprises a thin rod commonly referred to as a "needle," which has a hemispherical tip ground thereon, this tip engaged and disengaged from a conical valve seat surface during operation of the injector.

Pressurized fuel supplied to the injector discharges through a hole in the conical seat when the needle tip is unseated. When the tip is seated, fuel flow past the tip is prevented by a sealing engagement of the tip with the seat. Complete and reliable sealing engagement is critical, and it has been found that a very fine polishing or "superfinishing" of the needle tip to form a perfectly spherical shape is necessary to reliably and consistently achieve sealing when the needle engages the valve seat.

This polishing has in the past been carried out by a fine grit stone tool which is rotated about an axis inclined at a specified angle to the needle axis, the needle also rotated axis during polishing. A pocket forms in the stone tool has a pocket formed therein which engages the needle tip to polish the same.

According to current practice, the tool is mounted on a quill shaft which is allowed to axially float, while the stone is being lightly urged into engagement with the needle tip by a constant pneumatic pressure exerted on the holder shaft. The shaft is mounted in a bore to have a slight clearance and centered in o-rings which allow some lateral shifting of the polishing stone to the extent of the clearance.

However, slight variations in the relative offset position and inclination of the shaft and needle inevitably occur during production. These variations are not accommodated by the clearance space and cause slight interferences as the needle and stone each rotate about their respective axes. This in turn leads to variations in the polishing pressure as the needle and stone are rotated and ultimately introduces slight variations in the shape of the needle tip which, while slight, can nonetheless cause fuel leakage.

It is the object of the present invention to provide a tool quill for use in fuel injector needle polishing operations which accommodates slight variations in the orientation and position of the needle and polishing tool to ensure constant pressures as the tool is rotated about the perimeter of the needle tip.

SUMMARY OF THE INVENTION

The above object is achieved by mounting the polishing stone to a shaft with a universal joint so as to allow slight tilting with respect to the axis of rotation of the stone as it is rotated. This is accomplished in one embodiment by a universal joint comprised of a pair of clevis members pinned to a pivot block at respective 90° rotated positions to allow tilting of the stone in any direction. The universal joint may be confined by a shrink wrap tube to create a slight elastic resistance to tilting from an aligned position of the clevis members. At the same time, the tool shaft is mounted with much smaller clearance space to limit lateral shifting of the shaft and polishing stone so that accommodation of positioning errors is achieved almost entirely by the tilting movement.

Alternatively to the use of a shrink wrap tube, the clevis member pivots can be packed with a pasty filler material, which cures to form a flexible stabilizing mass holding the clevis members aligned with the rotation axis when not rotating, but allowing tilting accommodation to insure constant polishing pressure when the tool is in use.

In a second embodiment, the polishing stone is mounted to a universal joint comprised of an elastomeric coupling, which similarly allows slight tilting in any direction by elastic deflection of the elastomeric material, while normally holding the stone tool in the aligned position.

The tilting capability of the polishing stone during finishing of the needle tip insures substantially constant polishing pressure while both the needle and stone are being rotated about their respective axes to insure an almost perfectly true tip shape.

This has been found to improve the quality of superfinished needle tips, substantially reducing the number of leaking injectors produced.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
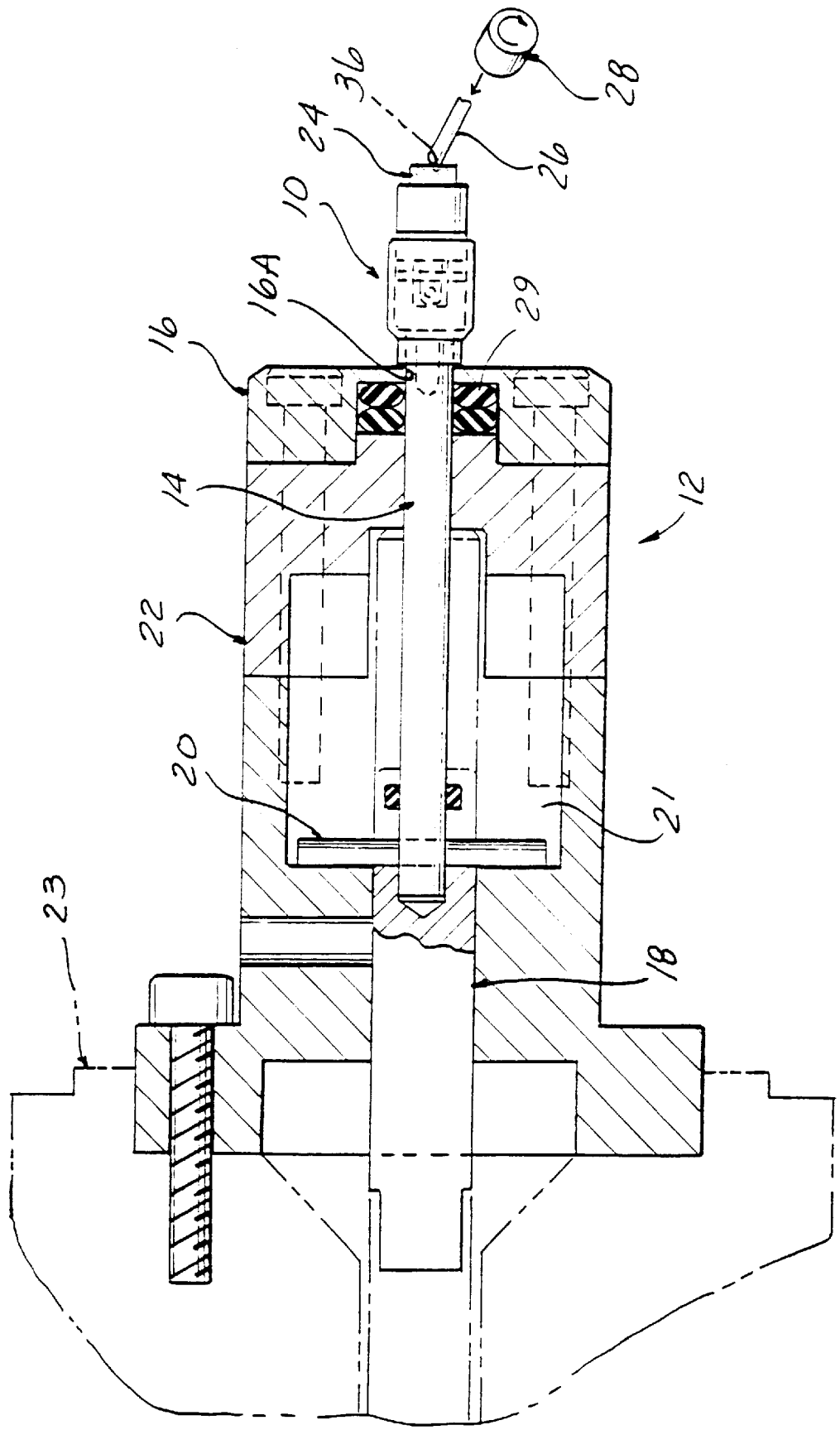
FIG. 1 is a partially sectional enlarged view of a tool holder and shaft according to the present invention and an associated tool quill and a fragmentary view of an injector needle held in a tool chuck and being rotated while being polished.

Referring to FIG. 1, a tool quill 10 is shown installed in a tool holder 12, of a type used in the prior practice described above. The tool quill 10 includes an elongated shaft 14 connected to a piston 18 at its rear end by a cross pin 20. Cross pin 20 is disposed in a slot 21 in a chuck housing 22 to allow axial movement of the shaft 14 while preventing relative rotation. A constant low air pressure is applied to the piston 18, in the manner according to conventional practice to lightly urge the polishing stone 24 held by the tool quill 10 into engagement with the tip of an injector needle 26.

The tool holder 12 is rotated by a spindle 23 (shown in phantom) to cause a polishing of the needle tip 26 which is also rotated at the same time by means of a rotary three jaw chuck 28, depicted diagrammatically.

The shaft 14 is closely fit to be slidably guided in hole 16A in the end cap 16, i.e., a 0.03 mm clearance is provided with hole 16A in end cap 16. Thus, O-rings 29 shown are not relied on as in the former practice to resiliently center the shaft 14.

Figure 3:
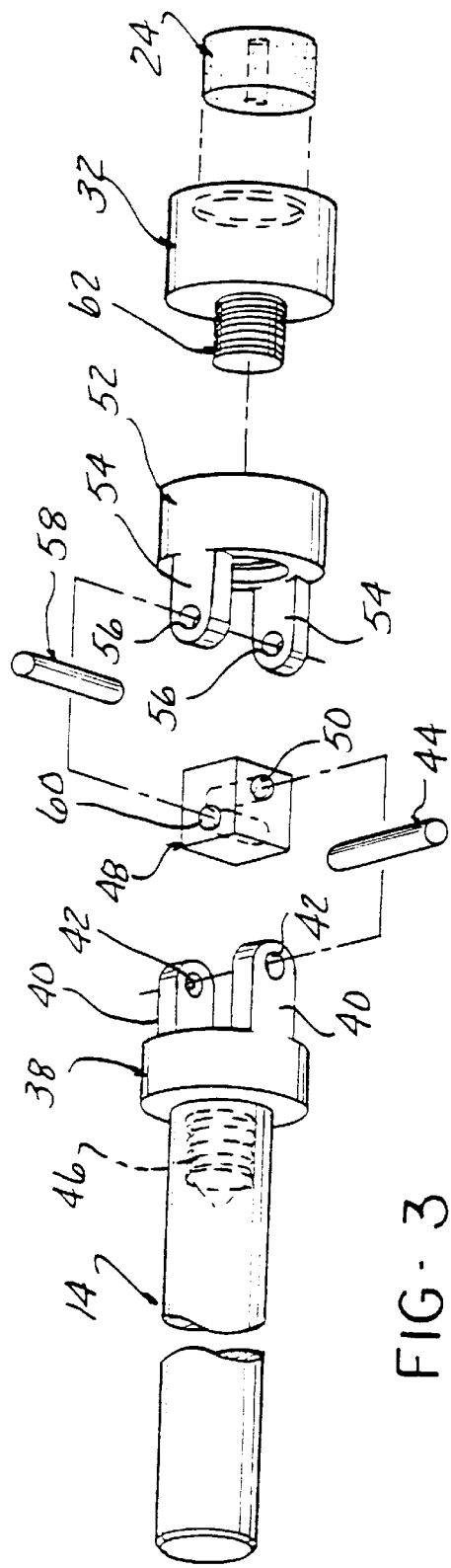
FIG. 3 is an exploded perspective view of the tool holder components.
Figure 2:
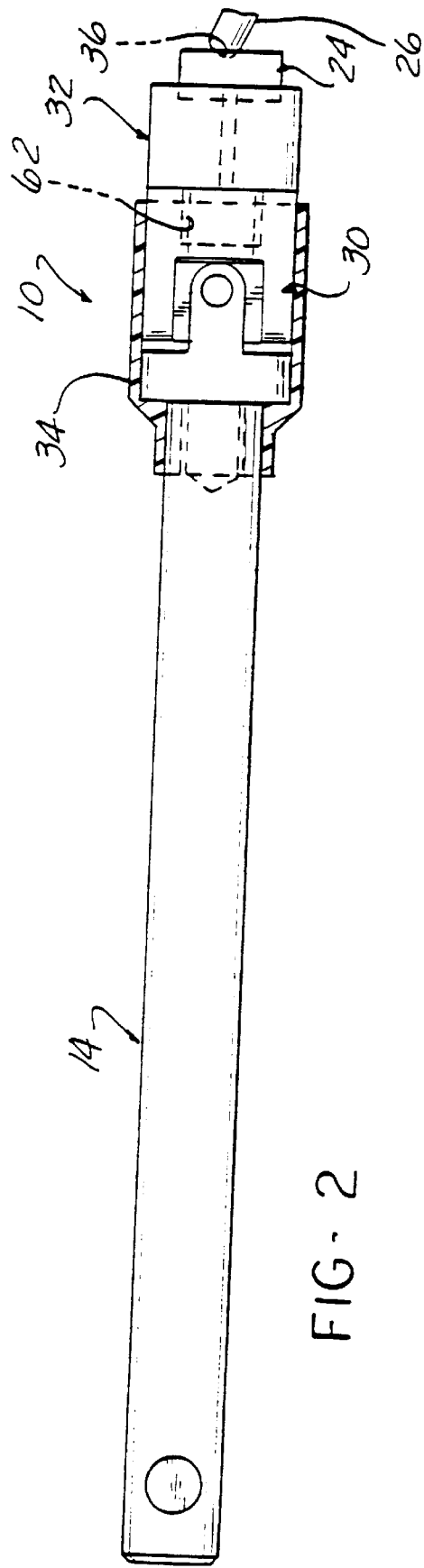
FIG. 2 is a further enlarged side elevational view of the tool quill and shaft shown in FIG. 1, and a fragmentary view of the top of an injector needle.
Figure 4:
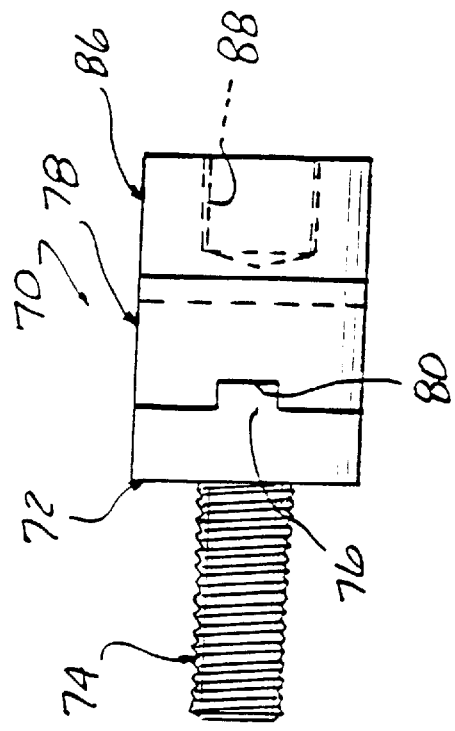
FIG. 4 is a side elevational view of an alternate form of tool holder according to the invention.
Figure 7:
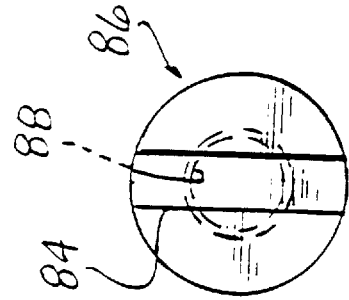
FIG. 7 is an end view of the stone holder component included in the tool quill of FIG. 4.
Figure 6:
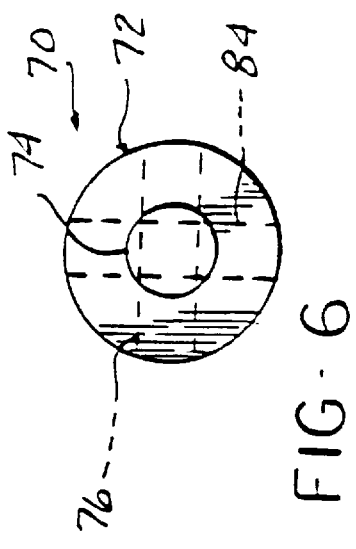
FIG. 6 is an end view of the tool holder shown in FIG. 4.
Figure 5:
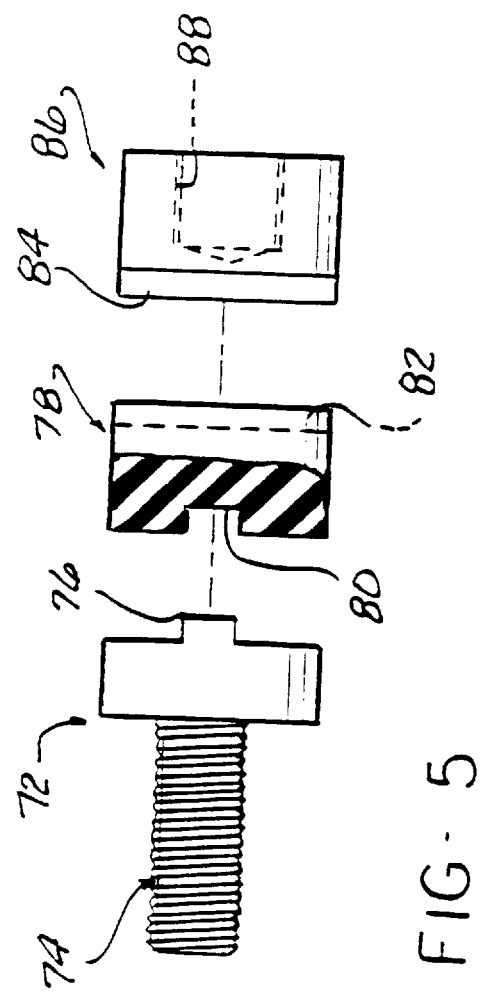
FIG. 5 is an exploded partially sectional view of the components of the tool holder shown in FIG. 4.

As seen in FIGS. 2 and 3, the tool quill 10 includes a universal joint 30 allowing tilting of a stone holder 32 about two orthogonal axes to accommodate slight variations in the specified angle between the tool axis and the axis of the injector needle 26.

A thin piece of plastic shrink tubing 34 is installed over the universal joint 30 which normally tends to hold the stone holder 32 in alignment with the axis of the shaft 14 when the shaft 14 is not being rotated.

The stone 24 forms a partially spherical dimple or pocket 36 when processing begins, which pocket 36 is fit to a section of the partially spherical tip surface of the injector needle 26.

The universal joint 34 is comprised of a first U-shaped clevis 38 having a pair of spaced apart arms 40 having aligned holes 42 to receive a first pivot pin 44.

The first clevis 38 has an integral threaded mounting stud 46 received in a threaded bore extending axially into the protruding end of the shaft 14.

An intermediate pivot block 48 has a first cross bore 50 which receives the pin 44 when the block 48 is disposed between the arms 40.

A second U-shaped clevis 52 has a pair of spaced arms 54 drilled with aligned holes 56 configured to receive a second pivot pin 58.

The second clevis 52 is installed with its arms 54 rotated 90° from those of the first clevis 38, with the arms 54 extending between the arms 40 so as to bring holes 56 into alignment with a second orthogonal cross bore 60 in block 48, allowing installation of the second pin 58 pivot.

Stone holder 32 has a threaded stud 62 received in a threaded bore 64 extending axially into the end face of the second clevis 52.

The stone holder 32 receives the polishing stone 24 in a recess in its opposite face, polishing stone adhesively bonded therein to be fixedly mounted.

The stone holder 32 is able to slightly pivot about the orthogonal axis of each pivot pin 44 and 58 as the polishing operation is conducted against the resistance created by the tubing 34. This has been found to accommodate slight misalignments and offsets to maintain a constant polishing pressure and insure a super finishing of the tip of the injector needle 26.

As an alternative to the heat shrink tubing 34, a pasty filler can be applied to the U-joint 30 which cures to a flexible mass tending to elastically hold the stone holder 32 in alignment with the axis of rotation of the shaft 14. Such suitable filler is "Flexane 80" from DEVON, a urethane rubber material.

FIGS. 4–7 show an alternate embodiment of a universal joint 70 which can be substituted for universal joint 30 described above.

A flange member 72 has a stud 74 adapted to be received in the threaded axial bore in the shaft 14. A transverse integral drive key 76 extends across the opposite end face.

A solid elastomeric bushing 78 has a mating slot 80 fit to the key 76 on one end, and a second slot 82 on the other end receiving a key 84 on a mounting piece 86.

The mounting piece 86 has a threaded bore 88 adapted to receive the stud 62 on the stone holder 32.

The elastomeric bushing 78 is adhesively bonded to the flange member 72 and mounting piece 86.

The flexibility of the elastomeric bushing 78 allows tilting of the stone older 32 from a normally aligned position to insure constant pressure as in the above described embodiment.

I claim:

1. A tool quill for holding a polishing stone for finishing a workpiece having a partially spherical surface engaged by a partially spherical pocket in said polishing stone, said tool quill comprising:
    an elongated shaft;
    a spindle for rotating said elongated shaft;
    means nonrotatably mounting said elongated shaft on said spindle, said means allowing floating movement along a longitudinal axial axis thereof;
    means for urging said elongated shaft in an axially outward direction from said spindle;
    a stone holder having said polishing stone attached thereto; and, a bushing of an elastomeric material normally holding said stone holder on an outer end of said shaft in alignment with said shaft when said shaft is not being rotated while allowing tilting of said stone holder with respect to a longitudinal axis of said shaft in any direction.

2. The tool quill according to claim 1 wherein said means urging said elongated shaft in an axially outward direction from said spindle includes means exerting a constant fluid pressure on said elongated shaft.

3. A tool quill for holding a polishing stone for finishing a workpiece having a partially spherical surface engaged by a partially spherical pocket in said polishing stone, said tool quill comprising:
    an elongated shaft;
    a spindle for rotating said elongated shaft;
    means nonrotatably mounting said elongated shaft on said spindle, said means allowing floating movement along a longitudinal axial axis thereof;
    means for urging said elongated shaft in an axially outward direction from said spindle;
    a stone holder having said polishing stone attached thereto;
    a bushing of an elastomeric material normally holding said stone holder on an outer end of said shaft in alignment with said shaft when said shaft is not being rotated while allowing tilting of said stone holder with respect to a longitudinal axis of said shaft in any direction; and
    a flange on said outer end of said shaft having one side of said elastomeric bushing bonded thereto.

4. The tool quill according to claim 3 further including a mounting piece having a side bonded to another side of said elastomeric bushing, said mounting piece having another side having said stone holder mounted thereto.

5. The tool quill according to claim 4 wherein a slot is formed in one side of said mounting piece or said flange and a mating key is formed in the adjacent side of said elastometric bushing.

6. The tool quill according to claim 5 wherein a slot is formed in the remaining side of said elastomeric bushing and a mating key is formed in the other of said flange or said mounting piece.

7. A method of polishing the partially spherical tip of a fuel injector needle comprising the steps of:
    supporting a polishing stone having a partially spherical pocket in engagement with said needle tip;
    rotating said polishing stone about a first axis while rotating said fuel injector needle about a second axis at an angle to said first axis while allowing tilting movement of said polishing stone out of alignment with said first axis during rotation thereof and also allowing axial float of said stone; and urging said stone axially into engagement with said needle tip with a constant light pressure.

8. The method according to claim 7 further including the step of holding said stone in alignment with said first axis with an elastic holding force to allow titling against said elastic holding force.

* * * * *